United States Patent
Chang

(10) Patent No.: US 7,444,549 B1
(45) Date of Patent: Oct. 28, 2008

(54) METHOD AND APPARATUS FOR FACILITATING DEBUGGING OF AN INTEGRATED CIRCUIT

(75) Inventor: Si-En Chang, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 579 days.

(21) Appl. No.: 11/033,616

(22) Filed: Jan. 11, 2005

(51) Int. Cl.
G06F 11/00 (2006.01)

(52) U.S. Cl. .......................................... 714/40; 712/227
(58) Field of Classification Search ..................... 714/40
See application file for complete search history.

(56) References Cited

U.S. PATENT DOCUMENTS

| 6,948,098 | B2 * | 9/2005 | Pillay et al. ..................... 714/34 |
| 7,013,409 | B2 * | 3/2006 | Gergen et al. .................. 714/34 |
| 7,237,149 | B2 * | 6/2007 | Moyer et al. ................... 714/30 |
| 7,266,728 | B1 * | 9/2007 | Edwards et al. ............... 714/39 |
| 2003/0051192 | A1 * | 3/2003 | Pillay et al. ..................... 714/39 |
| 2004/0236992 | A1 * | 11/2004 | Adkisson et al. .............. 714/30 |
| 2006/0013294 | A1 * | 1/2006 | Regnier ....................... 375/224 |
| 2006/0225050 | A1 * | 10/2006 | Thekkath ..................... 717/128 |

* cited by examiner

Primary Examiner—Christopher S McCarthy
(74) Attorney, Agent, or Firm—Park, Vaughan & Fleming LLP

(57) ABSTRACT

One embodiment of the present invention provides a system that facilitates debugging an integrated circuit without probing signal lines within the integrated circuit. During operation the system updates a performance counter within the integrated circuit based on the occurrence of one or more performance events. Note that some integrated circuits already include a performance counter which is used to measure the performance of the integrated circuit. Next, the system triggers a debugging operation based on the content of the performance counter, thereby facilitating debugging of the integrated circuit without probing signal lines within the integrated circuit. By using the performance counter to trigger the debugging operation in addition to measuring performance, the present invention can substantially reduce the amount of additional circuitry required to facilitate debugging of the integrated circuit.

17 Claims, 3 Drawing Sheets

METHOD AND APPARATUS FOR FACILITATING DEBUGGING OF AN INTEGRATED CIRCUIT

FIELD OF THE INVENTION

The present invention relates to techniques for debugging integrated circuits. More specifically, the present invention relates to a method and an apparatus for facilitating debugging of an integrated circuit without probing signal lines within the integrated circuit.

BACKGROUND

Related Art

Rapid advances in computing technology have made it possible to perform trillions of computational operations each second on data sets that are sometimes as large as a trillion bytes. These advances can be largely attributed to the exponential increase in the size and complexity of integrated circuits.

A computer system usually contains one or more functional blocks, such as, processor, memory, I/O controller, etc. Typically, these functional blocks are implemented on separate integrated circuits (or chips).

Due to the exponential increase in the size and complexity of integrated circuits, it has become nearly impossible to design circuits without any bugs. As a result, circuit debugging has become an absolutely critical task in the circuit design process.

Recently, circuit designers have started implementing multiple functional blocks on a single integrated circuit. This architecture, often called a "system on chip" (SoC) architecture, is rapidly gaining popularity.

Before the advent of SoC architectures, circuit designers typically debugged systems by using logic analyzers to observe the interface signals between integrated circuits.

Unfortunately, it is almost impossible to use an external device, such as a logic analyzer, to observe interface signals between the functional blocks within an SoC. This makes debugging an SoC extremely difficult.

To facilitate debugging, some SoCs include a history buffer, which records transactions or packets between the functional blocks. Unfortunately, history buffers are relatively small in size. This can be a problem because error-causing events can occur over a long period of time. However, history buffers are usually not large enough to store transactions and/or packets for such long periods of time. Consequently, the information stored in a history buffer can be useless for debugging such error-causing events.

Hence what is needed is a method and an apparatus for facilitating debugging of an integrated circuit without the above mentioned problems.

SUMMARY

One embodiment of the present invention provides a system that facilitates debugging an integrated circuit without probing signal lines within the integrated circuit. During operation the system updates a performance counter within the integrated circuit based on the occurrence of one or more performance events. Note that some integrated circuits already include a performance counter which is used to measure the performance of the integrated circuit. Next, the system triggers a debugging operation based on the content of the performance counter, thereby facilitating debugging of the integrated circuit without probing signal lines within the integrated circuit. By using the performance counter to trigger the debugging operation in addition to measuring performance, the present invention can substantially reduce the amount of additional circuitry required to facilitate debugging of the integrated circuit.

In a variation on this embodiment, the integrated circuit can include a microprocessor, a memory, an interface controller, a bus, or a performance counter.

In a variation on this embodiment, the performance event can include a cache miss, a cache hit, a new transaction entering a transaction queue, a transaction leaving a transaction queue, or a threshold crossing.

In a variation on this embodiment, the debugging operation can involve stopping a system clock; recording a transaction or a packet into a history buffer; starting the recording of transactions or packets into a history buffer; or stopping the recording of transactions or packets into a history buffer.

In a variation on this embodiment, the system updates the performance counter by using a performance counter configuration register (PCCR) to determine whether to update the performance counter upon the occurrence of an event.

In a further variation on this embodiment, the PCCR includes an event selector field, which identifies an event that can cause the performance counter to be updated, and a condition field, wherein if the event occurs, the condition field is used to determine whether the performance counter should be updated.

In a variation on this embodiment, the system triggers the debugging operation by using a performance counter debug configuration register (PCDCR) to determine whether a debug operation needs to be triggered, and if so, which debug operation to trigger.

In a variation on this embodiment, the PCDCR includes an enable field, which specifies whether a debugging operation should be triggered, a debug-operation field, which specifies which debugging operation should be triggered, a start-threshold field, which specifies when the debugging operation should be started, and a stop-threshold field, which specifies when the debugging operation should be stopped.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

System on Chip (SoC)

A circuit usually contains one or more functional blocks, such as, processor, memory, I/O controller, etc. Traditionally, these functional blocks have been implemented on separate integrated circuits (or chips).

Due to the exponential increase in the size and complexity of integrated circuits, it has become almost impossible to design these circuits perfectly, i.e., without any bugs (or errors). As a result, circuit debugging has become an absolutely critical task in the design process.

Recently, circuit designers have started implementing these functional blocks on a single integrated circuit. This architecture, often called a "system on chip" (SoC) architecture, is rapidly gaining widespread popularity.

Before the advent of SoC architectures, circuit designers have typically debugged circuits using logic analyzers, which allow circuit designers to observe the interface signals between integrated circuits.

Figure 1:
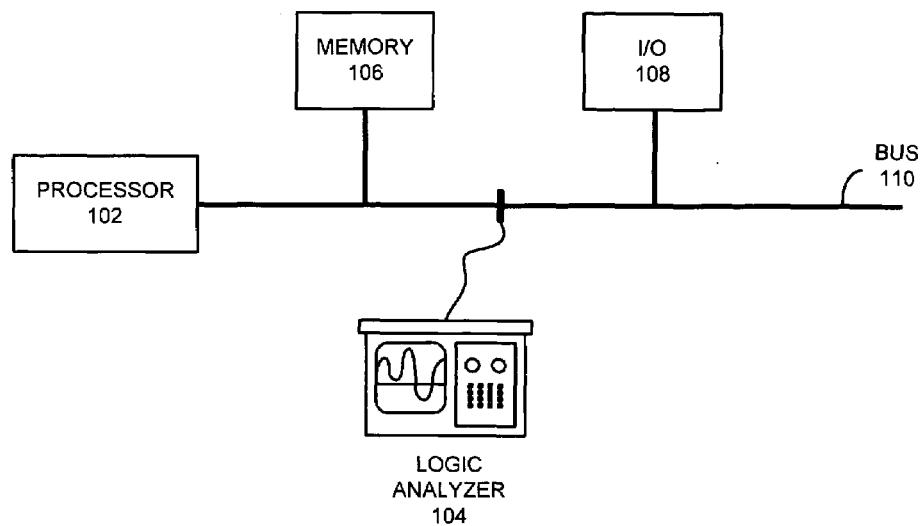
FIG. 1 illustrates a typical computer system and a logic analyzer in accordance with an embodiment of the present invention.

FIG. 1 illustrates a typical computer system and a logic analyzer in accordance with an embodiment of the present invention.

Processor 102 is coupled to memory 106 and I/O unit 108 through bus 110. Bus 110 can be any type of communication channel that can be used to transfer code and/or data between processor 102 and memory 106. Memory 106 includes, but is not limited to, random access memory, flash memory, magnetic storage devices and optical storage devices. I/O unit 108 receives and processes I/O requests from processor 102.

Logic analyzer 104 is coupled to bus 110. This allows logic analyzer 104 to probe address signals, data signals, and other signal lines on bus 110. In general, logic analyzer 104 can probe any signal lines in the computer system.

Figure 2:
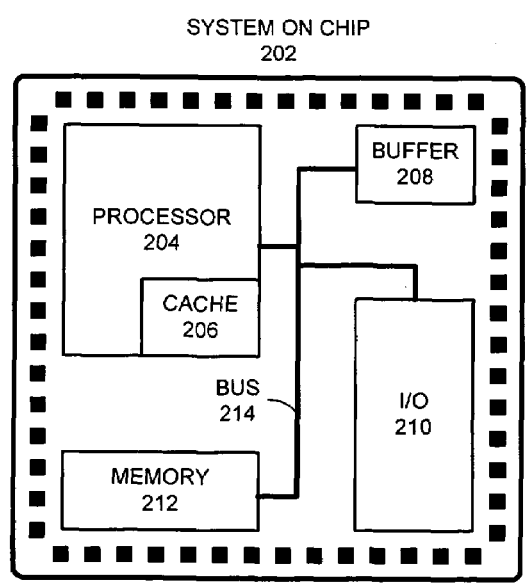
FIG. 2 illustrates a typical system on chip (SoC) architecture in accordance with an embodiment of the present invention.

FIG. 2 illustrates a typical system on chip (SoC) architecture in accordance with an embodiment of the present invention.

SoC 202 contains a processor 204 that is coupled with memory 212, I/O 210, and history buffer 208 via a bus 214. Moreover processor 204 can include cache 206 which can store data and/or code for use by processor 204. Note that all of these functional blocks reside within a single chip, namely, SoC 202. It will be apparent to one skilled in the art that SoC 202 can also include a variety of other functional blocks. For example, SoC 202 can include a variety of interface controllers, such as, Ethernet controllers, Universal Serial Bus (USB) controllers, keypad interface controllers, etc. Moreover, SoC 202 can also contain one or more performance counters.

Furthermore, bus 214 can be any type of communication channel that can be used to transfer code and/or data between processor 204 and other functional blocks. Memory 212 can be any type of memory device or a collection of memory devices that can be implemented within an integrated circuit. Moreover, memory 212 can also include a memory controller that interfaces with an external memory device. Specifically, memory 212 includes, but is not limited to, read only memory, random access memory, cache memory, and flash memory. I/O 210 receives and processes I/O requests from processor 204.

Since SoC 202 is a single chip, it is almost impossible to use an external device, such as a logic analyzer, observe interface signals between the functional blocks within SoC 202. This makes debugging an SoC extremely difficult. Hence, to facilitate debugging, some SoCs include a history buffer, such as buffer 208, which can be used to record transactions or packets between the functional blocks. Note that the history buffer can be viewed as a recording device that is integrated into the SoC. The information stored in the history buffer can be read just like any memory device and can be used for debugging purposes.

Unfortunately, history buffers have severe limitations due to their relatively small size. For example, a corner case bug often occurs when several events occur simultaneously. Moreover, these error-causing events usually occur over a long period of time. But, history buffers are usually not large enough to store transactions and/or packet for a long period of time. Consequently, the information stored in the history buffer can be useless for debugging such corner case bugs.

Hence, it is very important to be able to record only those events in the history buffer that are useful for debugging purposes. Furthermore, this functionality should be implemented without using a substantial amount of circuitry for obvious cost reasons.

One embodiment of the present invention enables a system to start recording transactions and/or packets into the history buffer once the system determines that important information for debugging purposes is available for recording. This ensures that the system does not miss useful information for debugging purposes.

Furthermore, one embodiment of the present invention stops recording new information into the history buffer once it contains the required information for debugging purposes. This ensures that the required information in the history buffer is not overwritten by subsequent transactions and/or packets that are not required for debugging.

Process of Triggering a Debugging Operation

Figure 3A:
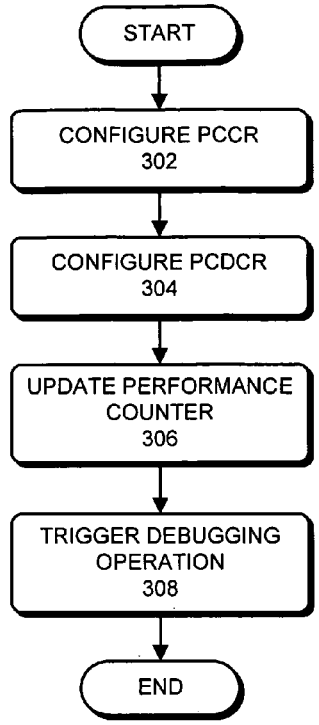
FIG. 3A presents a flowchart that illustrates the process of triggering a debugging operation in accordance with an embodiment of the present invention.

FIG. 3A presents a flowchart that illustrates the process of triggering a debugging operation in accordance with an embodiment of the present invention.

The process starts by configuring a performance counter configuration register (PCCR) (step 302). The system uses the PCCR to determine whether to update the performance counter upon the occurrence of an event.

Figure 3B:
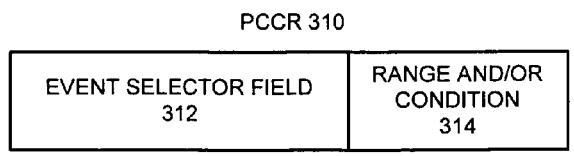
FIG. 3B illustrates a performance counter configuration register (PCCR) in accordance with one embodiment of the present invention.

FIG. 3B illustrates a performance counter configuration register (PCCR) in accordance with one embodiment of the present invention.

PCCR 310 includes an event selector field 312, which identifies an event that can cause the performance counter to be updated. PCCR 310 also includes a condition field 314, wherein if the event occurs, the condition field is used to determine whether the performance counter should be updated.

Next the system configures a performance counter debug configuration register (PCDCR) (step 304). The system uses the PCDCR to determine whether a debug operation needs to be triggered, and if so, which debug operation to trigger.

Figure 3C:
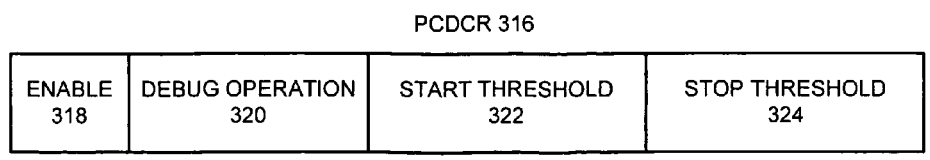
FIG. 3C illustrates a performance counter debug configuration register (PCDCR) in accordance with one embodiment of the present invention.

FIG. 3C illustrates a performance counter debug configuration register (PCDCR) in accordance with one embodiment of the present invention.

PCDCR 316 can include a number of fields, such as, an enable field 318, which specifies whether a debugging operation should be triggered, a debug-operation field 320, which specifies which debugging operation should be triggered, a start-threshold field 322, which specifies when the debugging operation should be started, and a stop-threshold field 324, which specifies when the debugging operation should be stopped.

The system then updates the performance counter based on the occurrence of one or more performance events (step 306). Note that, performance counters are often used in integrated circuits, such as microprocessors, to measure the performance of the integrated circuit by counting the number of occurrences of important performance-related events. Typically, these integrated circuits include a set of event detectors and performance counters that count the number of event occurrences.

In one embodiment of the present invention, the performance counter is used for an additional purpose, namely, to trigger a debugging operation. This allows the present invention to substantially reduce the amount of additional circuitry required to facilitate debugging of the integrated circuit, because the circuitry required to detect events and update the performance counter is usually present in advanced integrated circuits.

Next, the system triggers a debug operation based on the contents of the performance counter (step 308). Since the system uses the contents of the performance counter to trigger the debugging operation, the system facilitates debugging of the integrated circuit without using an external device to probe signal lines within the integrated circuit.

Performance Counter Based Debugging Circuit

Figure 4:
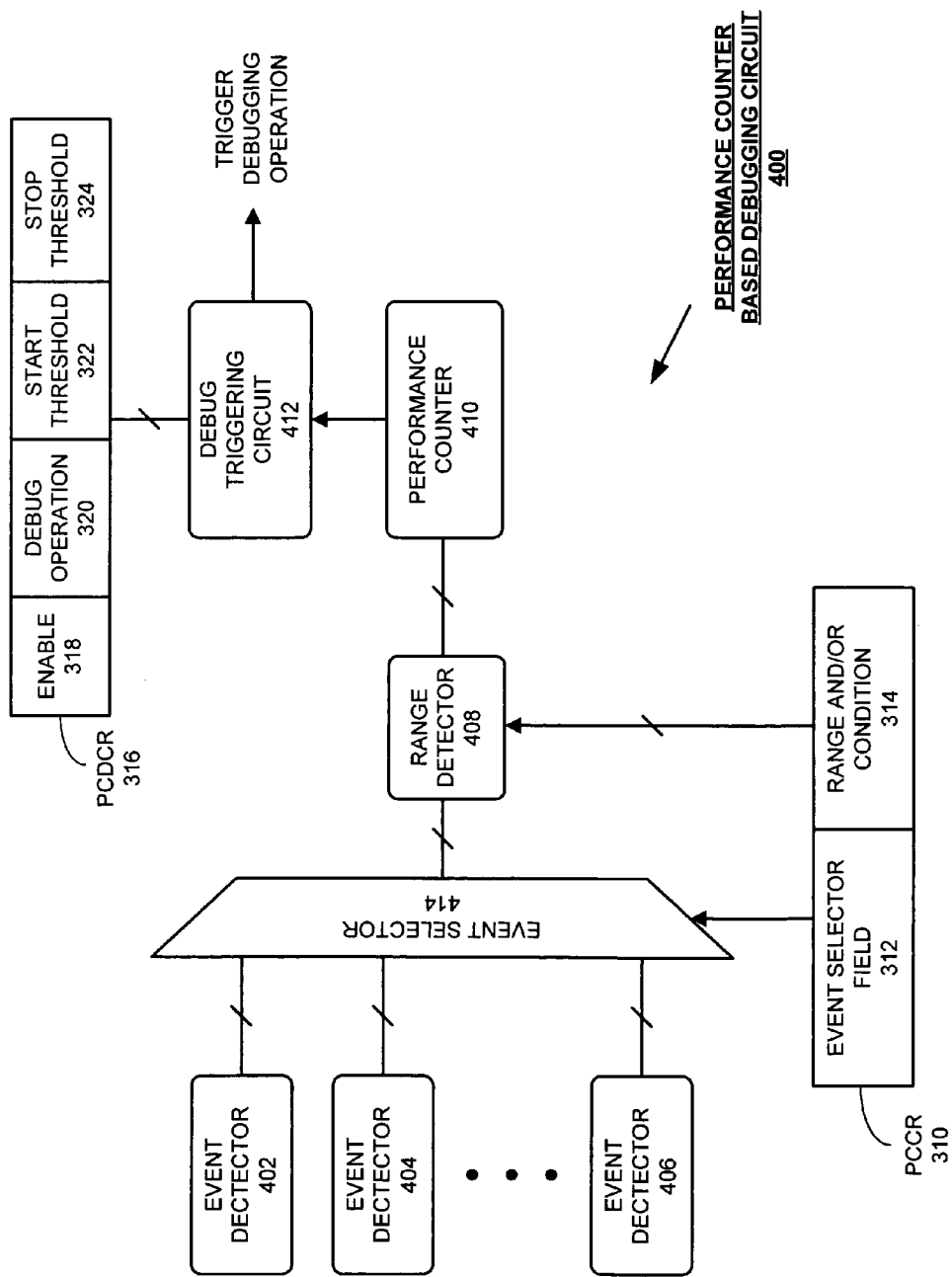
FIG. 4 illustrates a performance counter based debugging circuit in accordance with an embodiment of the present invention.

FIG. 4 illustrates a performance counter based debugging circuit in accordance with an embodiment of the present invention.

Performance counter based debugging circuit 400 includes a number of event detectors, namely, event detectors 402, 404, and 406. Circuit 400 also includes an event selector 414, range detector 408, performance counter 410, and a debug triggering circuit 412.

Event detector 402, 404, and 406 detect the occurrence of performance events. Specifically, these detectors are designed to detect the occurrence of events that are useful for analyzing the performance (or for debugging) the integrated circuit. For example, these event detectors can detect a cache miss, a cache hit, an addition to a transaction queue, a deletion from a transaction queue, or a threshold crossing. Moreover, in one embodiment of the present invention, several event detectors can share a counter.

It will be apparent to one skilled in the art that a variety of other relevant events can also be detected using these event detectors. It will also be apparent to one skilled in the art that a number of techniques can be used to implement these event detectors.

During operation, the event selector field 312 (which is part of PCCR 310) can be used to select which event will cause the performance counter 410 to be updated. Furthermore, the range and/or condition field 314 (which is part of PCCR 310) can be used to specify a range and/or condition which must be satisfied for the performance counter 410 to be updated. For example, if we want to count an event only if it exceeds a specified range, then we can use the range and/or condition field 314 to specify this criterion. More specifically, suppose we are interested in the following event: an 8-entry write back buffer contains more than 4 entries. By appropriately setting the event selector field 312 and the range and/or condition field 314, we can enable circuit 400 to detect this event. Specifically, event selector field 312 can enable event selector 414 to select the appropriate events. Range detector 408 can ensure that the performance counter 410 is updated only when the condition specified in the range and/or condition field 314 is satisfied.

Debug triggering circuit 412 contains circuitry that triggers a debugging operation based on the conditions specified using PCDCR 316. Note that a debugging operation can include, but is not limited to, stopping a system clock, recording a transaction or a packet into a history buffer, starting the recording of transactions or packets into a history buffer, or stopping the recording of transactions or packets into a history buffer.

For example, PCDCR 316 can be configured so that the debug triggering circuit 412 stops the system clock and turns off recording of the history buffer when the value of the performance counter 410 becomes greater than the value of the stop threshold field 324. Note that, all circuit states are usually preserved after the clock is stopped. Subsequently, the state information can be shifted out (e.g., using a JTAG full-scan chain) for further examination.

Furthermore, since the history buffer is also turned off, all relevant transactions are preserved. Note that, since a history buffer is usually a free running first-in-first-out (FIFO) buffer, it is very important to turn it off using the debug triggering circuit 412. Otherwise, subsequent transactions and/or packets that are not important for debugging can overwrite the contents of the buffer that are important for debugging purposes. The content of the history buffer can be accessed via regular read instructions or using JTAG full-scan access.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate debugging of an integrated circuit without probing signal lines within the integrated circuit, wherein the integrated circuit includes performance counters but does not include debug counters, the method comprising:

updating a performance counter within the integrated circuit based on the occurrence of one or more performance events, wherein the performance counter is updated using updating circuitry, wherein the updating circuitry and the performance counter are specifically designed to measure performance of the integrated circuit, and wherein the updating circuitry and the performance counter are not designed to debug the integrated circuit; and using the performance counter to debug the integrated circuit by triggering a debugging operation based on the performance counter's contents, thereby facilitating debugging of the integrated circuit without probing signal lines within the integrated circuit, wherein the debugging operation involves at least one of stopping a system clock, recording a transaction or a packet into a history buffer, starting the recording of transactions or packets into a history buffer, or stopping the recording of transactions or packets into a history buffer;

wherein reusing the performance counter to trigger the debugging operation in addition to measuring performance obviates the need for having separate debug counters and also obviates the need for having separate circuitry for updating debug counters, and hence, substantially reduces the amount of additional circuitry required to facilitate debugging of the integrated circuit.

2. The method of claim 1, wherein the integrated circuit includes:
 a microprocessor;
 a memory;
 an interface controller;
 a bus; and
 a performance counter.

3. The method of claim 1, wherein the performance event is one of:
 a cache miss;
 a cache hit;
 a new transaction entering a transaction queue;
 a transaction leaving a transaction queue; and
 a threshold crossing.

4. The method of claim 1, wherein updating the performance counter involves using a performance counter configuration register (PCCR) to determine whether to update the performance counter upon the occurrence of an event.

5. The method of claim 4, wherein the PCCR includes:
 an event selector field, which identifies an event that can cause the performance counter to be updated; and
 a condition field, wherein if the event occurs, the condition field is used to determine whether the performance counter should be updated.

6. The method of claim 1, wherein triggering the debugging operation involves using a performance counter debug configuration register (PCDCR) to determine whether a debug operation needs to be triggered, and if so, which debug operation to trigger.

7. The method of claim 6, wherein the PCDCR includes:
 an enable field, which specifies whether a debugging operation should be triggered;
 a debug-operation field, which specifies which debugging operation should be triggered;
 a start-threshold field, which specifies when the debugging operation should be started; and
 a stop-threshold field, which specifies when the debugging operation should be stopped.

8. An apparatus to facilitate debugging of an integrated circuit without probing signal lines within the integrated circuit, wherein the integrated circuit includes performance counters but does not include debug counters, the apparatus comprising:
 an updating mechanism configured to update a performance counter within the integrated circuit based on the occurrence of one or more performance events, wherein the updating mechanism and the performance counter are specifically designed to measure performance of the integrated circuit, and wherein the updating mechanism and the performance counter are not designed to debug the integrated circuit; and
 a triggering mechanism configured to use the performance counter to debug the integrated circuit by triggering a debugging operation based on the performance counter's contents, thereby facilitating debugging of the integrated circuit without probing signal lines within the integrated circuit, wherein the debugging operation involves at least one of stopping a system clock, recording a transaction or a packet into a history buffer, starting the recording of transactions or packets into a history buffer, or stopping the recording of transactions or packets into a history buffer;

wherein reusing the performance counter to trigger the debugging operation in addition to measuring performance obviates the need for having separate debug counters and also obviates the need for having separate circuitry for updating debug counters, and hence, substantially reduces the amount of additional circuitry required to facilitate debugging of the integrated circuit.

9. The apparatus of claim 8, wherein the integrated circuit includes:
 a microprocessor;
 a memory;
 an interface controller;
 a bus; and
 a performance counter.

10. The apparatus of claim 8, wherein the performance event is one of:
 a cache miss;
 a cache hit;
 an addition to a transaction queue;
 a deletion from a transaction queue; and
 a threshold crossing.

11. The apparatus of claim 8, wherein the updating mechanism is configured to use a performance counter configuration register (PCCR) to determine whether to update the performance counter upon the occurrence of an event, wherein the PCCR includes:
 an event selector field, which identifies an event that can cause the performance counter to be updated; and
 a condition field, wherein if the event occurs, the condition field is used to determine whether the performance counter should be updated.

12. The apparatus of claim 8, wherein the triggering mechanism is configured to use a performance counter debug configuration register (PCDCR) to determine whether a debug operation needs to be triggered, and if so, which debug operation to trigger, wherein the PCDCR includes:
 an enable field, which specifies whether a debugging operation should be triggered;
 a debug-operation field, which specifies which debugging operation should be triggered;
 a start-threshold field, which specifies when the debugging operation should be started; and
 a stop-threshold field, which specifies when the debugging operation should be stopped.

13. A computer system that includes a debugging-circuit to facilitate debugging of an integrated circuit without probing signal lines within the integrated circuit, wherein the integrated circuit includes performance counters but does not include debug counters, the debugging-circuit comprising:
 an updating circuit configured to update a performance counter within the integrated circuit based on the occurrence of one or more performance events, wherein the updating circuit and the performance counter are specifically designed to measure performance of the integrated circuit, and wherein the updating circuit and the performance counter are not designed to debug the integrated circuit; and
 a triggering circuit configured to use the performance counter to debug the integrated circuit by triggering a debugging operation based on the performance counter's contents, thereby facilitating debugging of the integrated circuit without probing signal lines within the integrated circuit, wherein the debugging operation involves at least one of stopping a system clock, recording a transaction or a packet into a history buffer, starting the recording of transactions or packets into a history buffer, or stopping the recording of transactions or packets into a history buffer;

wherein reusing the performance counter to trigger the debugging operation in addition to measuring performance obviates the need for having separate debug counters and also obviates the need for having separate circuitry for updating debug counters, and hence, substantially reduces the amount of additional circuitry required to facilitate debugging of the integrated circuit.

14. The computer system of claim 13, wherein the integrated circuit includes:
- a microprocessor;
- a memory;
- an interface controller;
- a bus; and
- a performance counter.

15. The computer system of claim 13, wherein the performance event is one of:
- a cache miss;
- a cache hit;
- an addition to a transaction queue;
- a deletion from a transaction queue; and
- a threshold crossing.

16. The computer system of claim 13, wherein the updating circuit is configured to use a performance counter configuration register (PCCR) to determine whether to update the performance counter upon the occurrence of an event, wherein the PCCR includes:
- an event selector field, which identifies an event that can cause the performance counter to be updated; and
- a condition field, wherein if the event occurs, the condition field is used to determine whether the performance counter should be updated.

17. The computer system of claim 13, wherein the triggering circuit is configured to use a performance counter debug configuration register (PCDCR) to determine whether a debug operation needs to be triggered, and if so, which debug operation to trigger, wherein the PCDCR includes:
- an enable field, which specifies whether a debugging operation should be triggered;
- a debug-operation field, which specifies which debugging operation should be triggered;
- a start-threshold field, which specifies when the debugging operation should be started; and
- a stop-threshold field, which specifies when the debugging operation should be stopped.

* * * * *